United States Patent [19]

Eastman et al.

[11] Patent Number: 4,862,755
[45] Date of Patent: Sep. 5, 1989

[54] TRANSFER CASE PLANETARY WITH ANNULUS GEAR POWER TAKEOFF

[75] Inventors: Richard E. Eastman, Central Square, N.Y.; Anand M. Jagani, Sepulveda, Calif.

[73] Assignee: Chrysler Motors Corporation, Highland Park, Mich.

[21] Appl. No.: 287,579

[22] Filed: Dec. 15, 1988

Related U.S. Application Data

[63] Continuation of Ser. No. 197,245, May 23, 1988, abandoned.

[51] Int. Cl.$^4$ ............................ F16H 37/8; F16H 3/44
[52] U.S. Cl. ........................................ 74/15.88; 74/789
[58] Field of Search ................... 74/15.8, 15.82, 15.84, 74/15.86, 15.88, 789

[56] References Cited

U.S. PATENT DOCUMENTS

| | | | |
|---|---|---|---|
| 2,749,756 | 6/1956 | George | 74/15.86 |
| 2,960,880 | 11/1960 | Wagner | 74/15.86 |
| 3,296,895 | 1/1967 | Karlsson | 74/15.88 |
| 3,406,579 | 10/1968 | Fisher et al. | 74/15.84 |
| 4,440,042 | 4/1984 | Holdeman | 74/785 |
| 4,604,908 | 8/1986 | Dolan | 74/15.88 |
| 4,640,153 | 2/1987 | Brogdon et al. | 74/789 |
| 4,677,873 | 7/1987 | Eastman et al. | 74/665 GE |

Primary Examiner—Leslie A. Braun
Assistant Examiner—Janice E. Chartoff
Attorney, Agent, or Firm—Edward P. Barthel

[57] ABSTRACT

An improved power takeoff arrangement for a vehicle four-wheel drive transfer case having high, neutral and low positions. The transfer case input shaft has a integral gear member defining the sun gear of a dual planetary gear assembly having its carrier rings grounded to the transfer case housing. A planetary annulus gear, formed with an inboard axial extension concentrically surrounding the inboard carrier ring, is driven by dual planet pinion gear sets journally supported between the carrier rings. The annulus gear inboard extension is formed with external helical gear teeth adapted to mesh with a power takeoff input gear accessible through an aperture in the housing side wall. The arrangement enables power at a constant relative speed to be transferred from the transfer case input shaft to the power takeoff gear in any of its three positions while obviating unbalanced loading of the dual pinion planetary assembly.

2 Claims, 2 Drawing Sheets

TRANSFER CASE PLANETARY WITH ANNULUS GEAR POWER TAKEOFF

This is a continuation of U.S. patent application Ser. No. 07/197,245, filed May 23, 1988, now abandoned.

BACKGROUND OF THE INVENTION

This invention relates to a transfer case for four-wheel drive vehicles and more particularly to an arrangement wherein a dual planetary gear reduction unit annulus gear delivers torque to a power takeoff gear box.

As discussed in the U.S. Pat. No. 4,604,908 issued Aug. 12, 1986 to C. F. Dolan and assigned to the present assignee of the instant application, it is desirable to provide a power takeoff arrangement for a four-wheel drive vehicle transfer case which is readily accessible and compact. In the Dolan patent the transfer case housing supports a planetary gear set annulus gear with the input shaft terminating in an end axial flange portion defining a sun gear. The Dolan inboard carrier ring rotatably supports a plurality of planet gears and includes peripheral gear teeth adapted to mesh with a power takeoff input gear interfacing the transfer case housing.

SUMMARY OF THE INVENTION

It is an object of the present invention to provide a transfer case for a four-wheel drive vehicle wherein a dual planetary gear reduction unit annulus gear has exterior teeth operative to deliver power to a takeoff gear meshed therewith.

It is another object of the present invention to provide a transfer case for a four-wheel drive vehicle as set forth above wherein the carrier of the dual planetary unit is grounded to the transfer case housing and the sun gear is fixed on the input shaft such that the planet gears always rotate the annulus gear at a constant relative speed in each of the transfer case shift positions.

The improved transfer case power takeoff assembly of the present invention involves a dual planetary gear assembly having an outboard carrier ring grounded to the transfer case housing. The inboard carrier ring is formed with a central bore concentrically encircling a shiftable clutch collar in a radially spaced manner. The clutch collar has internal splines slidably engaging external splines on the output shaft. A planetary annulus gear, formed with an inboard axial extension concentrically surround the inboard carrier ring, is driven by dual planetary gear sets journally supported between the carrier rings. The annulus gear inboard extension is formed with external helical teeth adapted to mesh with a power take-off input gear accessible through an aperture in the housing side wall. An annulus plate, concentrically disposed about the output shaft, has peripheral gear teeth in meshing engagement with internal teeth formed on the annulus gear extension. The annulus plate includes a central hub portion extending axially outboard therefrom and formed with an internally splined bore.

The annulus plate hub portion is concentrically interposed in spaced relation between the shiftable clutch collar and the inboard carrier ring central bore defining an annular clearance therebetween. A bushing is mounted on the annulus plate hub portion in the annular clearance so as to journally support the inboard carrier ring thereon. The annulus gear extension external gear teeth are radially aligned with the bushing such that the power takeoff gear loads imposed on the annulus gear extension external teeth are transferred by the annulus plate directly to the inboard carrier ring via the annulus plate central hub bushing. This arrangement prevents unbalanced loading of the carrier thus obviating excessive gear wear or stress of the dual pinion planetary assembly when driving torque is transferred to the power takeoff unit.

The transfer case clutch collar may be shifted in one direction from a neutral position into a high or direct drive range position wherein it concentrically interconnects the input shaft integral sun gear directly to the output shaft. Upon returning the clutch collar to its neutral position the input shaft integral sun gear is uncoupled from the output shaft. Shifting of the clutch collar in the opposite direction from the neutral position achieves a low drive range position wherein the clutch collar external splines engage the annulus plate hub portion internally splined bore. Thus, with the clutch collar in any of its three positions, i.e. high, neutral or low a power takeoff input mode may be achieved by shifting the power takeoff gear into meshing engagement with the annulus gear extension external teeth. This results in power at a predetermined constant relative speed being transferred from the input shaft integral sun gear to the dual planetary gears and thence to the annulus gear external power takeoff teeth in either a high, neutral or low position of the sleeve.

Upon further shifting the clutch collar to low range position it concentrically interconnects the annulus plate hub portion internally splined bore with external splines on the clutch collar. As a result the predetermined low-range drive torque ratio is transferred from the input shaft integral sun gear to the dual planetary gears and thence via the annulus gear and the annulus plate through the clutch collar to the output shaft.

Other objects and advantages of the invention will be made apparent from the accompanying drawings and the detailed description of the preferred embodiment of the invention.

DESCRIPTION OF THE PREFERRED EMBODIMENT

Figure 1:
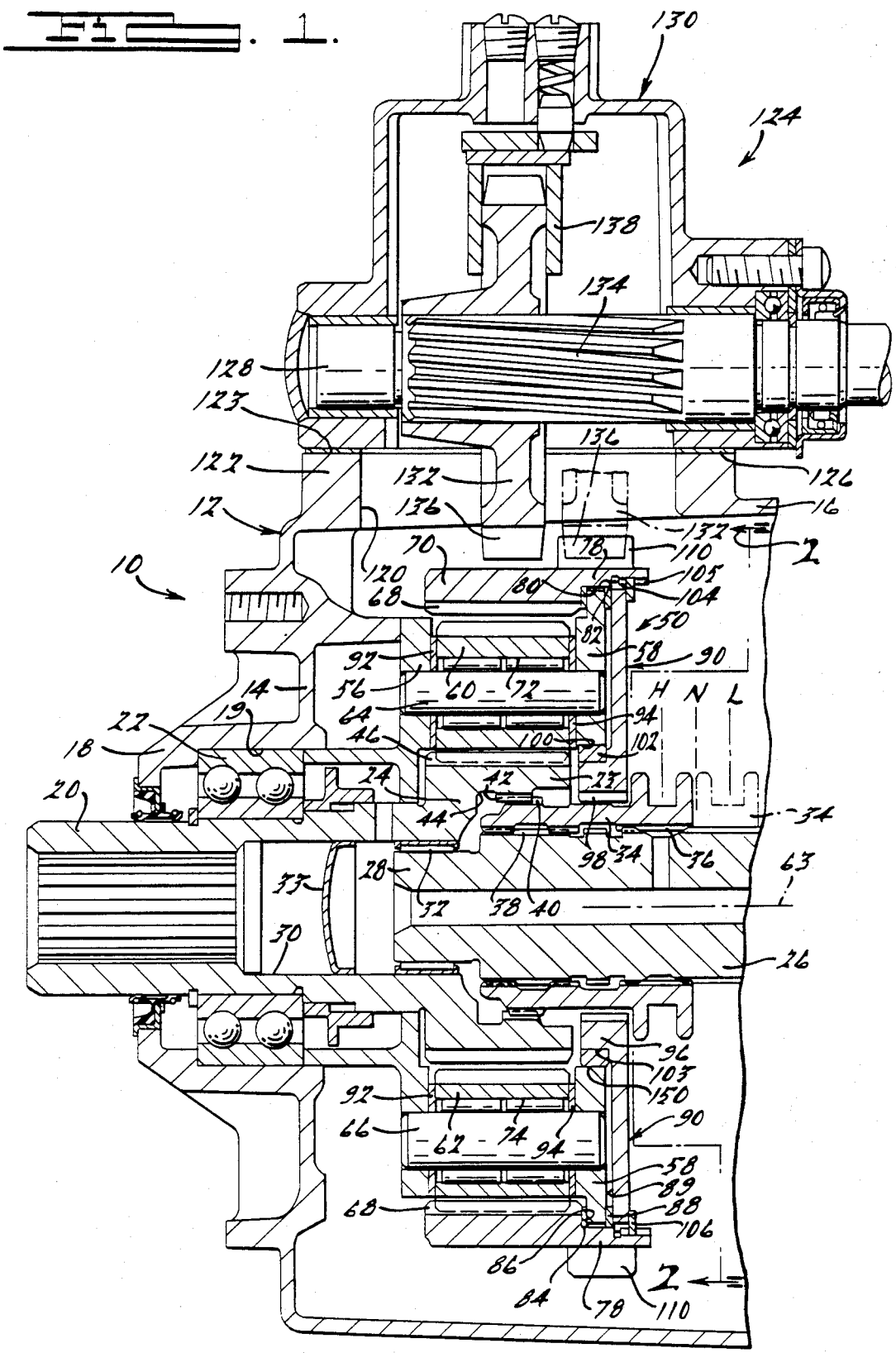
FIG. 1 is a fragmentary cross-sectional view of a portion of a transfer case showing a dual planetary gear assembly adapted to engage a power takeoff unit input adapter gear.

Referring now to the drawings, a portion of a transfer case constructed in accordance with the present invention is generally indicated at 10 in FIG. 1. A description of one type of a vehicle transfer case may be found in U.S. Pat. No. 4,677,873 issued July 7, 1987 to Eastman et al. and assigned to the assignee of the instant application the disclosure of which is incorporated by reference herein. As shown in FIG. 1 a transfer case housing 12 includes an end wall 14 with a side wall 16 extending inboard therefrom in an axial direction.

The end wall 14 has an annular hub portion 18 formed therein having an axial bore 19 supporting an input shaft 20 thereon by means of a double row annular contact ball bearing assembly 22. The input shaft 20 terminates in an outwardly stepped integral axially extending end flange portion 23 joined to the input shaft 20 by an intermediate stepped radially extending flange portion 24. An output shaft 26 is aligned on the longitudinal principal axis of the input shaft 20 and has a pilot portion 28 journally received in input shaft bore 30 by needle bearings 32. An end plug 33 closes the bore 30. The output shaft 26 has a clutch collar 34 slidably supported thereon by means of collar internal splines 36 engaged with output shaft external splines 38.

The clutch collar 34 has external clutch teeth 40 shown slidably engaged with internal clutch teeth 42 provided in axial counter-bore 44 formed in inboard end of the input shaft 20. Torque is transferred directly from the input shaft 20 through the engaged teeth 40, 42 and the collar internal splines 36 to the external splines 38 of the output shaft 26, thereby establishing a first or direct high ratio drive range shown by shift collar position "H".

Figure 2:
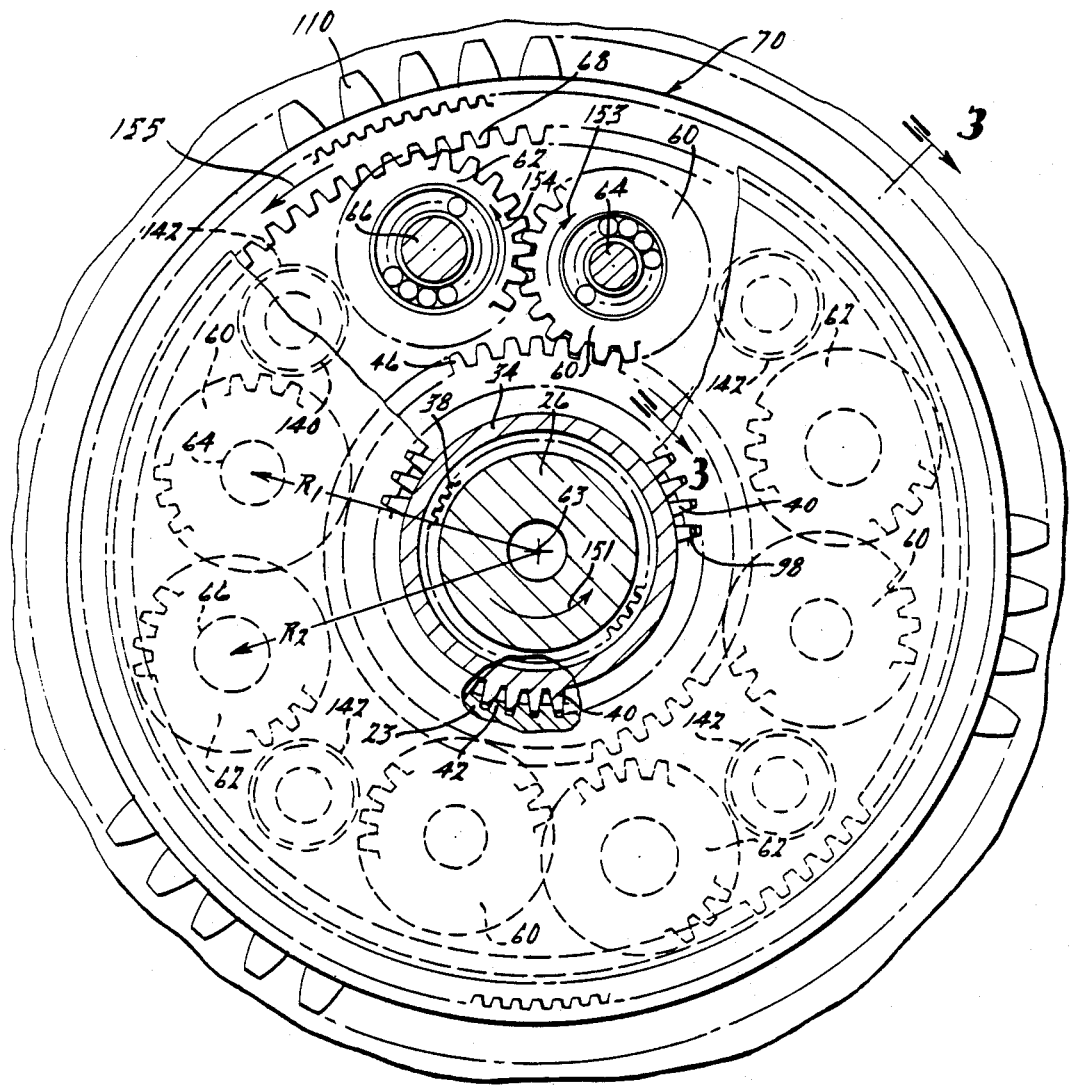
FIG. 2 a fragmentary cross-sectional view taken on line 2—2 of FIG. 1 with parts broken away.

As seen in FIGS. 1 and 2, the input shaft axial flange portion 23 has formed thereon helical sun gear teeth 46 of a helical planetary gear assembly generally indicated at 50. A planetary carrier is provided comprising outer 56 and inner 58 axially spaced ring members. The carrier ring members 56 and 58 support first and second sets of circumferentially spaced inner and outer planet pinion gears. In the disclosed form the first inner set of four inner planet pinion gears 60 and the second outer set consists of four outer planet pinion gears 62. It will be noted that the inner and outer pinion gear 60 and 62 are equal in diameter and formed with the same number of identical gear teeth, i.e., twenty-one gear teeth on each pinion gear 60 and 62 in the disclosed embodiment.

The inner pins 64 have their pins axes located at a first radius "R1", a predetermined lesser radial distance outwardly from the axis 63 of the output shaft 26 than the radius "R2" of the outer pins 66. Thus, the sun gear teeth 46 are in meshing engagement with the teeth of each inner planet gear 60 while internal teeth 68 of annulus gear 70 are in meshing engagement with the teeth of each outer planet gear 62. Further, the first and second sets of pinion gears 60 and 62 are disposed in paired meshing engagement such that each first set inner pinion gear 60 drives its associated paired second set outer pinion gear 62. In the preferred embodiment there are four pinion gears 60 in the first inner set and four pinion gears 62 in the second outer set each defining four pairs of intermeshed pinion gears with each pair uniformly spaced at ninety degree intervals.

It will be noted that the inner pin 64 is smaller in diameter than the outer pin 66 while the helical teeth of the planet pinion gears 60 and 62 are identical in size and pitch diameter. Thus, the central bore 72 of each inner planet pinion gear 60 is smaller than the central bore 74 of the outer pinion gear 62. The difference in bore and pin sizes between the planet pinion gear sets allows ready identification during assembly.

As seen in FIG. 1 the annulus gear 70 concentrically surrounds the two sets of respective inner and outer planet pinion gears 60 and 62. It will be noted that the annulus gear internal gear teeth 68 are in meshing engagement with the teeth of each of the four outer planet pinion gears 62, while the sun gear teeth 46 are in meshing engagement with each of the four inner pinion gears 60. The annulus gear 70 includes an axially directed inboard extension portion 78 formed with an internal annular counterbored race 80 receiving in a spaced concentric manner outer periphery 82 of the inboard carrier ring 58. Annular washer 84 is interposed between the inboard carrier ring 58 and race vertical shoulder 86 of the annulus gear while annular washer 88 is interposed between the inboard carrier ring 58 and opposed face 89 of an annulus plate, generally indicated at 90. Annular outer and inner washers 92 and 94 respectively, are provided on the pinion pins 64 and 66.

The annulus plate 90 is formed with an integral central cylindrical hub portion 96. The annulus plate hub portion 96 has an axial concentric internally splined bore 98 adapted for engagement with the clutch collar external splines 40 upon sliding the collar 34 to the right to its phantom low range position indicated by the dashed line "L" in FIG. 1. It will be seen that the inboard carrier ring 58 has its inner concentrically formed opening 100 journally supported on an annular hydrodynamic bushing 102. The bushing 102 is sized for press-fit reception on concentric annular exterior surface 103 of the hub portion 96.

The annulus plate 90 has its outer periphery formed with external splines 104 engaged with internal splines 105 provided on the annulus gear inboard extension portion 78. An expanding snap ring 106 retains the annulus plate 90 splined to the annulus gear. The outer periphery of the annulus gear extension portion 78 is formed with external power takeoff helical gear teeth 110. The medial transverse plane of the annulus power takeoff gear teeth 110 is defined by the construction line 112 shown in FIG. 3. It will be noted that the transverse vertical plane of the construction line 112 also coincides with the medial plane of the annular hydrodynamic bushing 102.

The annulus gear external helical gear teeth 110 extend outwardly adjacent to a rectangular access opening 120 (FIG. 1) in the housing side wall 16 so as to be aligned radially therewith. The opening 120 is defined by a peripheral frame 122 defining a planar mounting interface 123.

A conventional power takeoff gear box unit or assembly, generally indicated at 124 in FIG. 1, is adapted to be mounted on the interface 123 such as by machine bolts (not shown). A peripheral seal 126 is provided between the interface surface 123 and the mating gear box surface to seal housing opening 120 during operation. The gear box assembly 124 includes a longitudinally extending power takeoff shaft 128 journally supported in its case 130 with the shaft 128 oriented parallel with the transfer case axially aligned input 20 and output 26 shafts. The takeoff shaft 128 has a helical toothed takeoff gear 132 formed with internal splines slidably mounted on external splines 134 of the shaft 128 for rotation therewith. The gear 132 is sized such that its helical gear teeth 136 extend radially through the opening 120 and are positioned to slidably mesh with the annulus gear peripheral teeth 110. Thus, the helical gear 132 is shifted axially rightwardly or inboard by fork mechanism 138 to its dashed line position for driving engagement with the annulus gear extension external helical gear teeth 110.

Figure 3:
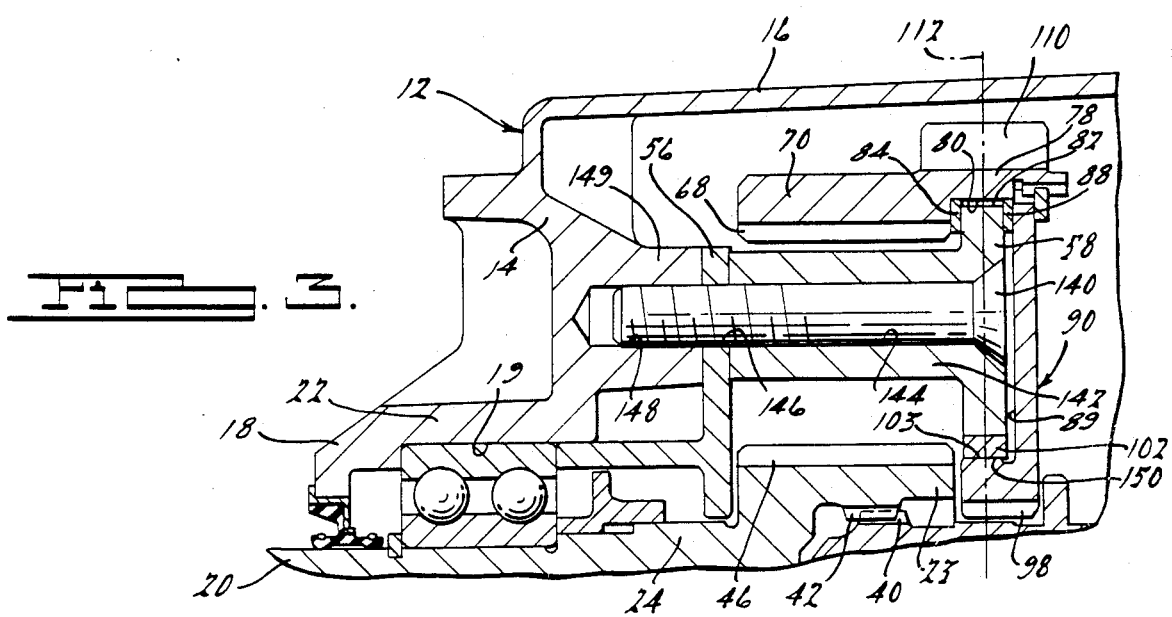
FIG. 3 a fragmentary cross-sectional view taken on line 3—3 of FIG. 2 showing the dual planetary carrier grounding structure located intermediate adjacent sets of planetary pinion gears.

With reference to FIGS. 2 and 3 it will be seen that the carrier outer and inner rings 56 and 58 are fixed to the transfer case housing 12 by means of spaced machine screws 140. Each machine screw extends through one of a plurality of boss portions 142 formed integral with inner carrier ring 58. Each carrier boss 142 has an axial bore 144 aligned with a hole 146 in the outer portion carrier ring and a blind bore 148 formed in a mating boss 149 in the housing wall portion 14. Thus, the dual planetary carrier rings 56 and 58 are prevented from rotating thereby providing a dual planetary with a grounded carrier.

As viewed in FIG. 1 a unique advantage of the present design results from locating the external power takeoff teeth 110, formed on the extension portion 78 of the annular gear 70, in radial alignment with the busing 102 as shown by the transverse plane defined by construction line 112.

By virtue of this construction the loads imposed by the power takeoff gear 132 on the annulus gear extension external teeth 110 is initially transferred to the annulus plate 90 through the engaged splines 104 and 105. This power takeoff gear loading is transferred from the annulus plate hub portion 96 to the bushing 102 and thence via an oil film on bushing exterior surface 150 to the inboard carrier ring 58. As a result no eccentric loads from the power takeoff gear 132 are transferred to the planet pinion gear pins 64 and 66 thereby obviating the application of any unbalanced or "tipping" forces on the carrier assembly. The design thus prevents excessive gear teeth wear or stress conditions, such as tight meshing, for example, developing between the planet gears 60, 62 during operation of the transfer case in its power takeoff mode. Upon the clutch collar 34 being shifted to its third or low-drive ration position "L" drive torque is transferred from the input shaft 20 to the output shaft 26 via the annulus plate 90. This occurs because in low drive range the clutch collar external splines 40 are engaged with the annulus plate internal splines 98. It will be noted that the annulus gear 70 always rotates in fixed relation with the input shaft 20 because of the grounded carrier arrangement and the constant meshing of the outer planet pinions 62 with the annulus gear internal teeth 68. Thus, as the annulus gear 70 is always rotating, a feature of the present invention is that power may be transferred to the power takeoff gear 132 with the transfer case in any one of its three operative positions, i.e., high range, neutral, or low range.

Although only one embodiment of the subject invention has been illustrated and described, modifications and variations thereof will readily come to mind of a person skilled in the art which modification and variations do not fall outside the scope of the invention as defined hereinafter.

What is claimed is:

1. In a transfer case apparatus including a housing having an end wall defining an opening, said housing having outer wall means extending in an inboard direction from said end wall, axial bearing means journally supporting an input shaft in said end wall opening, said input shaft having one end terminating within said housing in an annular end flange portion joined by an intermediate stepped radially extending flange portion, said input shaft annular end flange portion formed with external helical gear teeth defining an integral sun gear, an output shaft journally supported in said housing, said output shaft having a clutch collar axially slidably thereon by means of collar internal splines engaged with external splines on said output shaft, said input shaft having an axial counter-bore formed in said input shaft annular end flange, internal clutch teeth formed in said input shaft counter-bore, external clutch teeth formed on said clutch collar slidable engageable with said input shaft counter-bore internal teeth when said clutch collar is moved axially into a high-range drive position, a helical dual planetary gear assembly comprising a carrier having outboard and inboard axially spaced carrier rings, said carrier rings supporting first inner and second outer sets of planet pinion gears rotatably supported on first and second sets of respective pins, said pins having their ends fixedly supported between said carrier rings at first and second radial distances, respectively, outward from the central axis of said output shaft, wherein said first radial distance is a predetermined lessor distance than said second radial distance, helical teeth of each of said first set pinion gear in meshing engagement with said helical sun gear teeth and helical teeth of each of said second set pinion gear in meshing engagement with internal helical teeth of an annulus gear concentrically disposed around said second set pinion gears, said first and second sets of pinion gears disposed in paired relation such that the teeth of each of first set pinion gear in meshing engagement with the teeth of a corresponding second set pinion gear, said carrier outboard ring fixed to said housing, said carrier inboard ring extending radially outwardly a predetermined distance beyond said second set of pinion gears, said annulus gear including an axially extending inboard cylindrical extension formed with an internal annular counterbored race receiving in a spaced concentric manner the outer periphery of said inboard carrier ring, said annulus gear extension formed with internal splines, an annulus plate positioned on the inboard side of said inboard carrier ring having its outer periphery formed with external splines engaged with said annulus gear extension internal splines, said annulus plate formed with a central hub portion extending outboard from said annulus plate, said hub portion having an axial internally splined bore concentrically encircling said clutch collar, said hub portion internally splined bore adapted to be engaged by said clutch collar external splines upon said clutch collar being moved axially to low drive range position, said inboard carrier ring formed with an axial bore encircling said annulus plate hub portion defining an annular clearance therebetween, an annular bushing interposed in said annular clearance concentrically positioning said annulus plate for rotation about said output shaft central axis, said annulus gear extension having external power takeoff helical gear teeth thereon, said housing outer wall means including an aperture radially aligned with said annulus gear power takeoff teeth, mounting means on said outer wall means for supporting a power takeoff gear box unit thereon including an helical toothed power takeoff input gear splined to an axially extending power takeoff shaft, a portion of said power takeoff input gear adapted to extend through said housing aperture for axial travel on said takeoff shaft into selective meshing engagement of its helical gear teeth with said annulus gear external power takeoff teeth, whereby with said power takeoff gear in meshing engagement with said annulus gear power takeoff teeth said transfer case input shaft operative, upon being rotated, to transfer power to said power takeoff gear.

2. In a transfer case apparatus including a housing having an end wall defining an opening, said housing having outer wall means extending in an inboard direction from said end wall, axial bearing means journally supporting an input shaft in said end wall opening, said input shaft having one end terminating within said housing in an annular end flange portion joined by an intermediate stepped radially extending flange portion formed with external helical gear teeth defining an integral sun gear, an output shaft journally supported in said housing, said output shaft having a clutch collar axially slidable thereon by means of collar internal splines engaged with external splines on said output shaft, said input shaft having an axial counter-bore formed in said input shaft annular end flange, internal clutch teeth formed in said input shaft counter bore, external clutch teeth formed on said clutch collar slidably engageable with said input shaft counter bore internal teeth when said clutch collar is moved axially outboard from a neutral position into a high-range drive position, the combination wherein:

a helical dual planetary gear assembly comprising a carrier having outboard and inboard axially spaced rings, said carrier rings supporting first inner and second outer sets of planet pinion gears rotatably supported on first and second sets of respective pins, said pins having their ends fixedly supported between said carrier rings at first and second radial distances, respectively, outward from the central axis of said output shaft, wherein said first radial distance is a predetermined lesser radial distance than said second radial distance, the helical teeth of each said first set pinion gear in meshing engagement with said helical sun gear teeth and helical teeth of each of said second set pinion gear in meshing engagement with internal helical teeth of an annulus gear concentrically disposed around said second set pinion gears, said first and second sets of pinion gears disposed in paired relation such that the teeth of each first set pinion gear in meshing engagement with the teeth of a corresponding second set pinion gear, said carrier outboard ring fixed to said housing, said carrier inboard ring extending radially outwardly a predetermined distance beyond said second set of pinion gears, said annulus gear including an axially extending inboard cylindrical extension formed with an internal annular counterbored race receiving in a spaced concentric manner the outer periphery of said inboard carrier ring, said annulus gear extension formed with internal splines, an annulus plate positioned on the inboard side of said inboard carrier ring having its outer periphery formed with external splines engaged with said annulus gear extension internal splines, said annulus plate formed with a central hub portion extending outboard from said annulus plate, said hub portion having an axial internally splined bore concentrically encircling said clutch collar, said hub portion internally splined bore adapted to be engaged by said clutch collar external splines upon said clutch collar being moved axially inboard from said neutral position to a low drive range position, said inboard ring formed with an axial bore encircling said annulus plate hub portion defining an annular clearance therebetween, an annular bushing interposed in said annular clearance concentrically positioning said annulus plate for rotation about said output shaft central axis, said annulus gear formed with external power takeoff helical gear teeth disposed on said annulus gear extension portion such that said annulus external power takeoff gear teeth are in radial alignment with said bushing, said housing outer wall means including an aperture radially aligned with said annulus gear extension power takeoff teeth, mounting means on said outer wall means for supporting a power takeoff gear box unit thereon including a helical tooth input gear rotatably supported of said axially extending power takeoff shaft disposed parallel to said transfer case input shaft, a portion of said input gear adapted to extend through said housing aperture for axial travel on said power takeoff shaft into selective meshing engagement with said annulus gear external teeth, such that power takeoff gear loads imposed on said annulus gear external takeoff teeth are transferred to said annulus plate inboard extension and thence via said annulus plate and said bushing to said inboard carrier ring, whereby upon shifting said clutch collar to any one of its high, neutral or low positions said input shaft operative to transfer power at a constant relative speed to said power takeoff gear while the radial alignment of said bushing and said annulus gear extension power takeoff teeth obviating unbalanced loading of said power takeoff unit on said dual planetary gear assembly.

* * * * *